Jan. 28, 1964    R. E. COLONIUS ETAL    3,119,306
CONTOURING AND PROFILING MACHINES
Filed Aug. 1, 1960    5 Sheets-Sheet 1

INVENTORS:
RAY E. COLONIUS
CHARLES R. ONSRUD
BY
ATT'YS

Jan. 28, 1964 R. E. COLONIUS ETAL 3,119,306
CONTOURING AND PROFILING MACHINES
Filed Aug. 1, 1960 5 Sheets-Sheet 3

INVENTORS:
RAY E. COLONIUS
CHARLES R. ONSRUD
BY

ATT'YS

FIG. 7

INVENTORS:
RAY E. COLONIUS
CHARLES R. ONSRUD
BY
Rummler & Snow
ATT'YS

United States Patent Office 3,119,306
Patented Jan. 28, 1964

3,119,306
CONTOURING AND PROFILING MACHINES
Ray E. Colonius, Palatine, and Charles R. Onsrud, Chicago, Ill., assignors to Onsrud Machine Works, Inc., Niles, Ill., a corporation of Illinois
Filed Aug. 1, 1960, Ser. No. 46,820
11 Claims. (Cl. 90—13.5)

This invention relates generally to machines for reproducing the contour and profile of a master template, and has particular reference to a machine for controlling the feed movement of a work holding table in accordance with the changes in profile of the master template.

One of the principal objects of the invention is to provide a machine where the work holding table thereof is controlled in its movement by motive fluid consisting of hydraulic fluid which is maintained at proper pressure by gaseous fluid from an independent pressure source.

Another object is to provide a work holding table controlled in its movement by a combination of gaseous and hydraulic pressure fluids, the rate of movement of the table being varied by means positioned in relation to the contours of the template and controlling the application of the hydraulic pressure fluid moving the work table.

Still another object is to provide a work holding table and template, and a profiling tool movable with respect to the work holding table and template, the movement of the table and template being regulated by a fixed control member cooperating with actuators for the control member which are positioned with respect to the contours of the template and adapted to regulate the application of motive fluid for moving the work holding table.

A yet further object is to provide in a machine tool of the class described a novel valve controlling hydraulic fluid for moving the work table, such valve being controlled in its operation by control devices which are positioned according to the changing contours of a master template.

Other objects and important features of the invention will be apparent from a study of the specification following taken with the drawings, which together describe and illustrate a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope and spirit of the subjoined claims.

Figure 1:
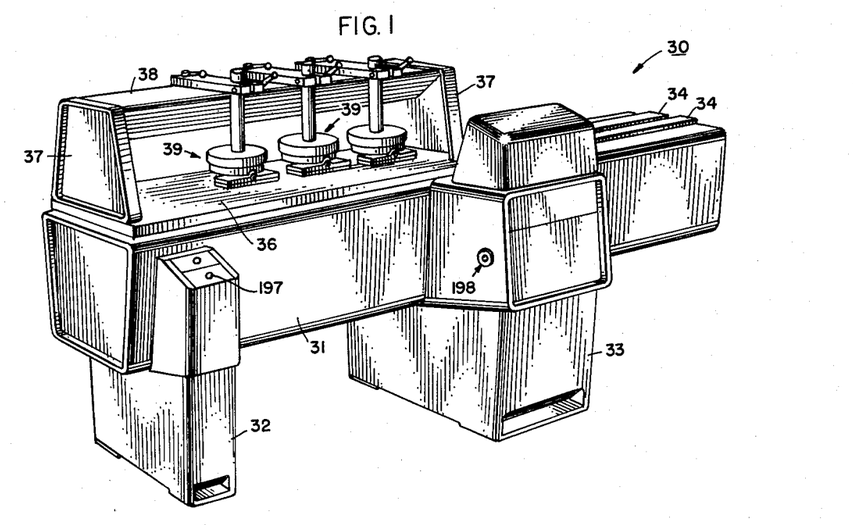
FIG. 1 is a perspective view of an improved contour and profile machine embodying the improvements according to the present invention.
Figure 2:
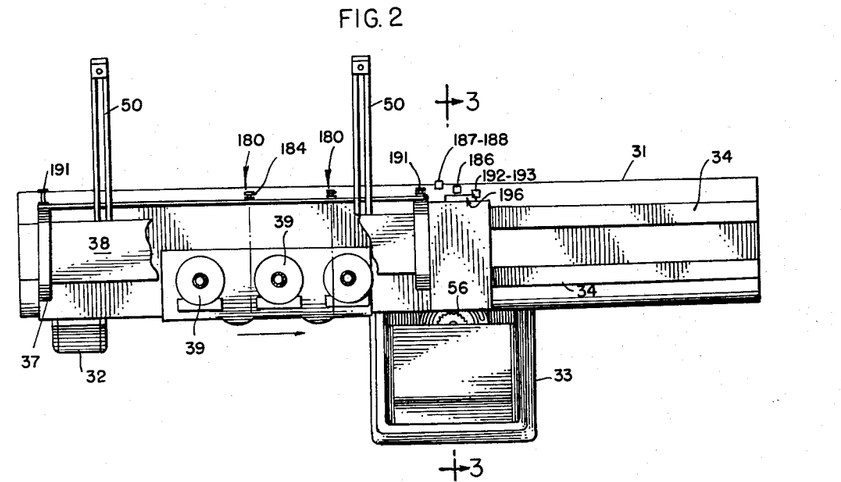
FIG. 2 is a plan view thereof.
Figure 3:
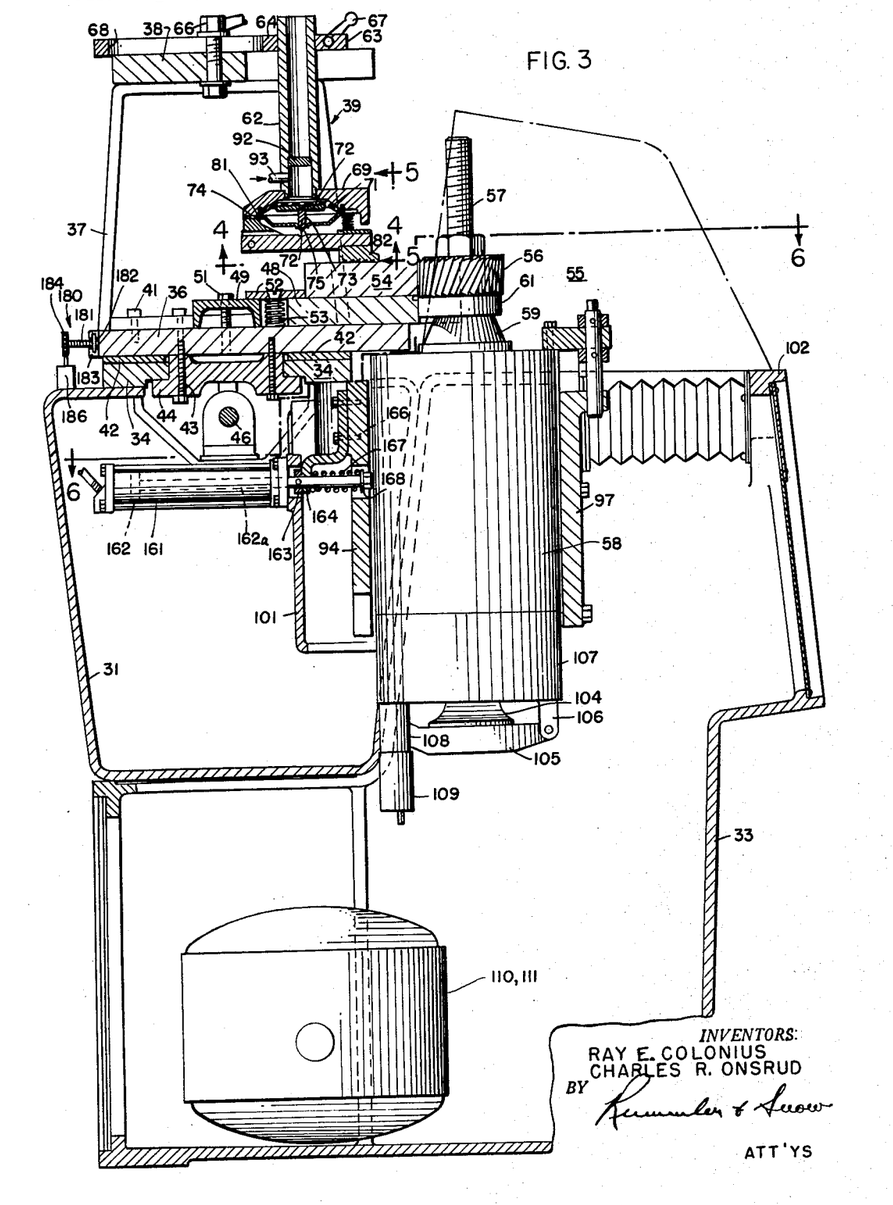
FIG. 3 is a transverse sectional view taken along the line 3—3 of FIG. 2, looking in the direction of the arrows.

Referring now particularly to FIGS. 1 to 3 of the drawings, the improved contour and profile machine according to the present invention is referred to generally by the reference numeral 30, and includes a main frame 31 supported upon spaced base members 32 and 33, base member 33 being hollow and being arranged to enclose certain control elements as will be described later. The main frame 31 has a pair of longitudinally extending spaced guideways 34 which guide a movable work holding table 36. Spaced standards 37 are each located at the ends of the work table 36 and are spanned by a clamping arbor 38 having a plurality of work clamping structures 39 spaced therealong.

As seen in FIG. 3, the end standards are held by cap screws 41 to the work table 36, and the bottom of the work table 36 is provided with plate-like bearing members 42 formed of low friction resinous material such as synthane, which is cycle bonded to the underside of work table 36. The bearing members 42 rest upon the slideways 34. The work table 36 is held by through bolts 43 to longitudinally spaced guides 44 which are guided between the guideways 34. The work holding table 36 is arranged to be moved longitudinally of the main frame 31 by means of a piston 45 and piston rod 46 moving in a cylinder 47, see FIG. 7. The piston rod 46 is secured to the underside of the moving table 36 in any convenient manner, and the cylinder 47 is secured to the frame 31 in any convenient manner.

The work holding table 36 supports a master template 48 secured thereto by means of a hold down device consisting a channel shaped member 49 secured to the table 36 by cap screws 51, and a hold down clamp consisting of a plate 52 bearing on the template 48 and the channel member 49. Plate 52 is held in position on the channel member 49 and template 48 by a screw 53 tapped into the work table 36. The hold down plate 52 for the template 48 may also form a guide for a work piece 54, which is arranged to be operated upon by a profiling tool indicated generally by the reference numeral 55 and including a profiling cutter 56 fast on a shaft 57 driven by a profiling motor 58. The motor 58 has a support 59 for a template following member 61, which is urged against the template 48 by structure as will be described.

The work piece 54 may additionally be supported upon spaced arms 50 seen in FIG. 2, arms 50 being secured to the work table 36 in any convenient manner.

Figure 4:
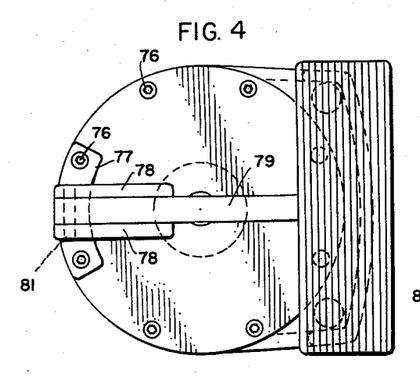
FIG. 4 is a bottom view of a work holding clamp for holding a work piece in position.
Figure 5:
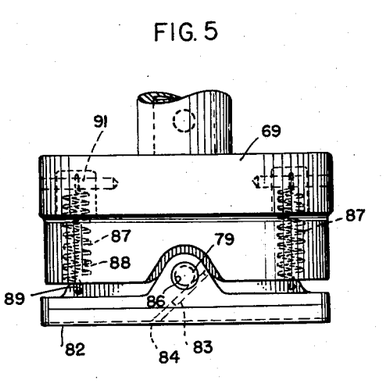
FIG. 5 is an elevation view thereof looking in the direction of the arrows 5—5 of FIG. 3.
Figure 6:
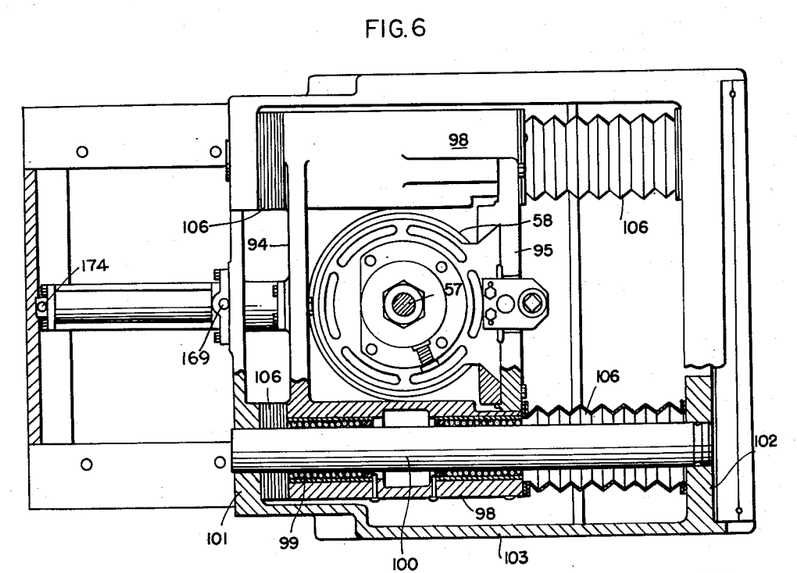
FIG. 6 is a view looking in the direction of the arrows 6—6 of FIG. 3, showing details of the profiling tool and the manner of guiding the same.

Referring also to FIGS. 4 and 5 of the drawings, each of the clamping structures 39 consists of a hollow cylindrical thrust transmitting member 62 which is held in split jaws 63 of a hold down member 64 held by a clamp 66 to the arbor 38. The split jaws 63 of the hold down member 64 are clamped together by a toggle clamp 67, see also FIG. 1. The hold down member 64 has a slot 68 therein so that its position can be adjusted with respect to the arbor 38 and work piece 54. It will be seen also that the split jaws 63 of the hold down member 64 permit vertical adjustment of the clamping member 39.

Each of the clamping structures 39 includes a pressure housing 69 secured to the lower end of the thrust transmitting member 62. Housing 69 is closed by a diaphragm 71 reinforced at its center by a plate 72. A pin 73 extends from plate 72 and is guided through an opening 75 in a closure 74 held to the housing by cap screws 76, see FIG. 4.

A clevis 77 held by the screws 76 to the housing 69 has spaced clevis arms 78 which guide an arm 79 pivoted to the clevis 77 at a pin 81. The arm 79 supports a clamping foot 82 at the other end thereof and clamping foot 82 is located in position at the end of the arm 79 by means of a pin 83 received in a bore 84 in the foot 82, the pin 83 sliding in an annular groove 86 in the rod 79. The clamping foot 82 is held in position as seen in FIGS. 3 and 5 by means of springs 87 received in bores 88 in the housing 69, each spring 87 being attached at 89 to the clamping foot 82 and being secured at its other end by a pin 91 pressed into the housing 69.

Figure 7:
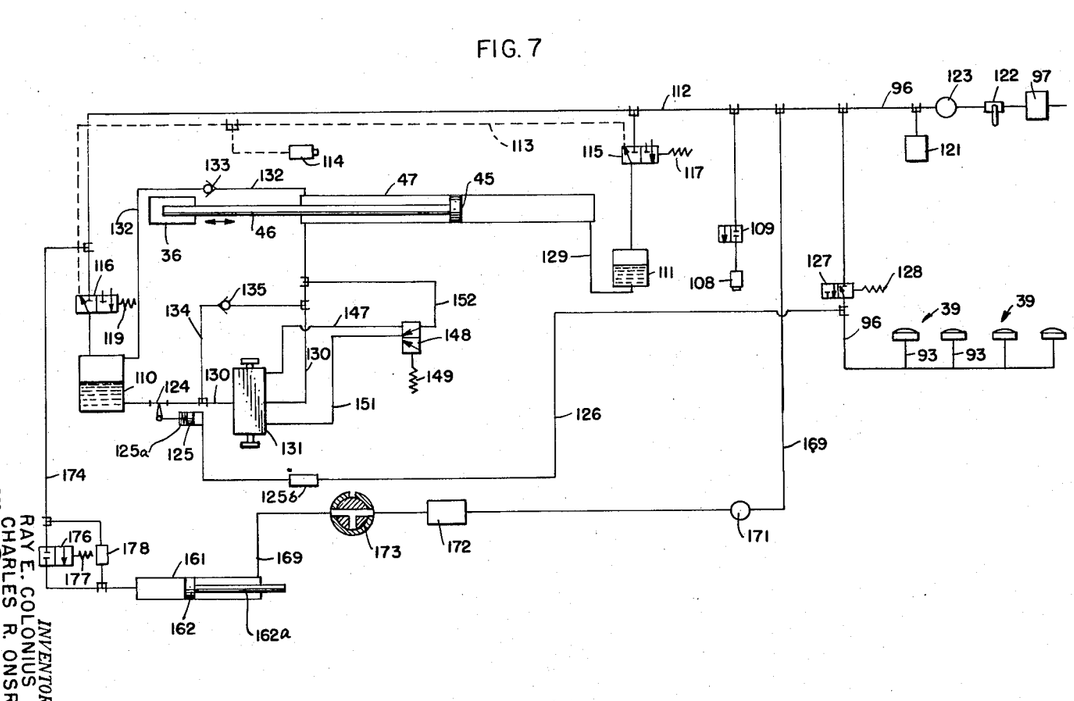
FIG. 7 shows a fluid pressure system consisting of both gaseous and hydraulic pressure fluid for controlling the operation of the machine according to the present invention.

Clamping pressure is provided for the clamping structure 39 by means of a pressure line 93 connected between a wall 92 in the hollow thrust member 62 and the diaphragm 72. As seen in FIG. 7, each of the clamping structures 39 is connected by its pressure line 93 to a line 96 which in turn is connected to a gaseous fluid pressure source 97. It will be seen that when pressure is admitted to the clamping members 39, each will cause the work piece 54 to be held in position atop the master template 48.

Structure is provided for guiding the profiling tool 56 and its driving motor 58 in directions transverse to the direction of movement of the work table 36, and to this end the motor 58 for driving the profiling tool 56 is held in a frame consisting of frame members 94 and 95, each of the frame members 94 and 95 being connected at their ends to a bearing housing 98. The bearing housings 98 each enclose a plurality of circulating bearing balls 99, and the housings 98 are guided upon rods 100, the rods 100 being secured at each end to respective end walls 101 and 102 of a frame 103. Frame members 101 and 102 are part of the base member 33 seen in FIG. 1.

The guide rods 100 are suitably enclosed by bellows 106 to prevent the entrance of foreign material to the bearing balls 99.

Structure is provided for braking the motor 58 and the cutter 56, and as seen in FIG. 3, the lower end to the shaft 57 of motor 58 has a flanged end 104 which cooperates with a brake shoe 105 pivoted at an abutment 106 on the end of a housing 107 for the motor 58. The brake shoe 105 is actuated by a brake cylinder 108, see FIG. 7, controlled by a solenoid operated brake control valve 109, see also FIG. 11.

Structure is provided for controlling the speed of movement of the work table 36, and the application of motive fluid to the cylinder 47 is accordingly regulated. The motive fluid for actuating the cylinder 47 is a combination of hydraulic fluid and gaseous fluid exerting pressure on the hydraulic fluid. As seen in FIG. 7, the hydraulic fluid is supplied to the cylinder 47, by reservoirs 110 and 111, pressure being selectively placed on the hydraulic fluid therein by gaseous fluid under pressure from the source 97 and directed into the space above the level of the fluid in the reservoirs 110 and 111. The reservoirs 110 and 111 are selectively connected to the source of gaseous fluid pressure 97 by a pressure line 112 and to an exhaust line 113, the exhaust line 113 having a muffler 114 connected thereon to muffle the sound of the exhausted gas. Solenoid operated valves 115 and 116 are selectively operated according to whether the reservoirs of hydraulic fluid 110 and 111 are to be connected to the source of gaseous pressure fluid at the source 97 or to atmosphere by the exhaust line 113.

For purposes of description at this point, valve 115 can be considered as a forward valve moving the table 36 to the left as seen in FIG. 7, in a working stroke and valve 116 can be considered as a reversing or return valve moving the table 36 to the right in a return stroke. Valve 115 is solenoid operated and is actuated by a solenoid 117 under the control of a forward relay 118, see also FIG. 11. Likewise, reverse valve 116 is actuated by a solenoid winding 119 under the control of a reversing relay 120.

Figures 10, 11:
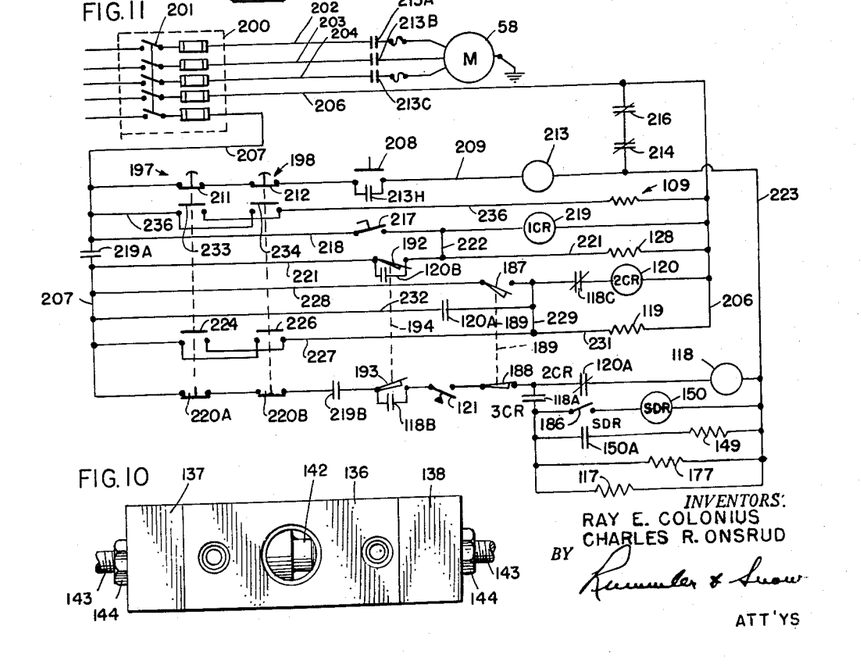
FIG. 10 is an end view of the valve seen in FIGS. 8 and 9, said view looking in the direction of the arrows 10—10 of FIG. 8.
FIG. 11 shows an electrical control circuit for the machine of the present invention.

Structure is provided for insuring that the gaseous pressure fluid is at proper working pressure before the above and other electrical control components can be actuated, and to this end the line 96 is connected to a pressure responsive switch 121, see also FIG. 11, which must be closed before the control circuit can be energized. The line 96 has a shut off valve 122 and a pressure regulating valve 123 connected therein.

The movement of the hydraulic fluid from the reservoir 110 to the cylinder 47 and vice versa is under the control of a valve 124 operated by a cylinder 125 connected in a line 126 branching from the line 96 connected to the work holding structure 39. Pressure can be applied to the cylinder 125 only when a clamping valve 127 is operated by a winding 128, see also FIG. 11.

As seen in FIG. 7, work table 36 is moved to the left by hydraulic pressure fluid moving by a line 129 from the reservoir 111 against piston 45 of the cylinder 47. The piston rod end of cylinder 47 is connected by a line 130 through a slow down valve 131 to the reservoir 110, there being an alternate path for the movement of the fluid by means of a by-pass line 132 having a check valve 133 therein.

Upon return movement of the piston 45, the slow down valve 131 is bypassed by a line 134 having a check valve 135, check valve 135, however, being closed when piston 45 moves to the left.

When piston 45 is moving to the left in a work stroke of table 36, reservoir 110 is connected through the valve 116 to the exhaust 113 and reservoir 111 is connected through valve 115 to the source of gaseous pressure fluid in line 112.

The slow down valve 131 regulates the rate at which hydraulic fluid is released from the piston rod end of cylinder 47 and the slow down valve 131 accordingly is arranged to constrict the flow of hydraulic fluid to the reservoir 110.

Figure 8:
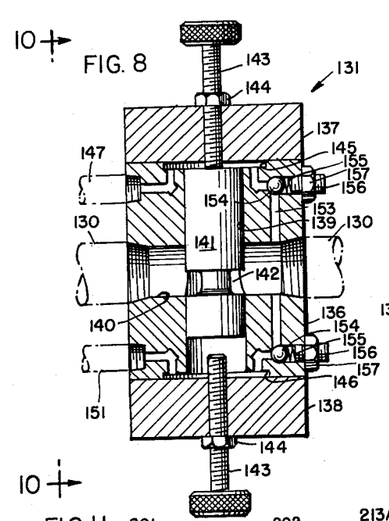
FIG. 8 is a longitudinal sectional view through a valve controlling the flow of pressure fluid for moving the work table seen in FIGS. 2 and 3, said valve being shown in a position corresponding to the maximum flow therethrough and for high speed movement of the work table.
Figure 9:
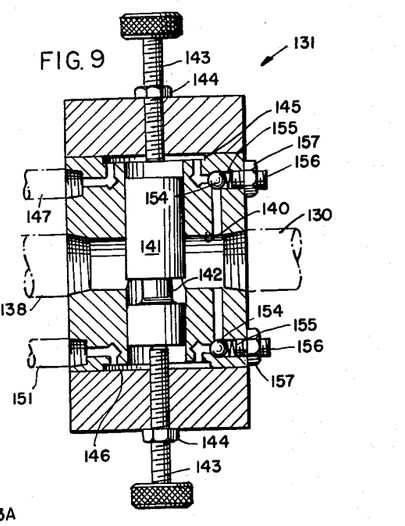
FIG. 9 is a view similar to FIG. 8, but showing the valve in a position for reducing the speed of movement of the work table.

Referring now to FIGS. 8, 9 and 10 of the drawings, the control valve 131 comprises a valve body 126 having end caps 137 and 138 secured to the valve body 136 in any convenient manner. Valve body 136 has a bore 139 therein intersected by a port 140 connected in the line 130. The bore 139 has a valve spool 141 slidable therein with a constricted diameter portion 142 past which the hydraulic fluid in the line 130 must flow. Valve spool 141 is limited in its movement in each direction by adjusting screws 143 tapped into the end caps 137 and 138 and locked in position by a lock nut 144. The adjustment of screws 143 determines the amount of constriction in port 140 when the spool 141 shifts to the position seen in FIG. 9.

A fluid pressure circuit is provided for creating a differential pressure across the ends of the valve spool 141, and to this end one end of the valve body 136 has a pressure cavity 145 communicating with one end of the valve spool 141 and a similar pressure cavity 146 at the other end of valve body 136 in communication with the other end of the valve spool 141. As seen in FIG. 7, pressure cavity 145 is connected by a line 147 to a solenoid operated valve 148, having a solenoid winding 149 which is under the control of a slow down relay 150, see FIG. 11.

The other pressure cavity 146 is connected by a line 151 to the valve 148, it in turn being connected by a line 152 to the line 130 connected to the hydraulic cylinder 47, see FIG. 7.

Each of the pressure chambers 145 and 146 are connected by a passageway 153 in the valve body 141 to the port 140. Each passageway 153 has a ball check valve 154 therein blocking flow from the port 140 to a respective chamber 145 or 146. Each check valve 154 is biased to closed position by an adjustable spring 155 which can be adjusted in its preload by an adjusting screw 156 and a locking nut 157.

During the feed movement of the table 36, the solenoid operated valve 148 is operated to a position whereby lines 152 and 151 are connected through valve 148, line 147 at slow down valve 131 being connected to the exhaust line 130 past check valve 154 and past chamber 145. The pressure in reservoir line 130 is manifested through valve 148 and line 151 against the lower side of the spool valve member 141 so that it adopts the position as seen in FIG. 8. Thus, when the work table 36 is moving at its usual working speed, the fluid exhausted from the piston rod end of the piston rod 47 passes directly through the valve 131 by way of the now opened port 140, the check valve 135 in the line 134 being closed at such time.

However, and under conditions as will be described, the exhaust fluid from the piston rod end of the cylinder 47 is throttled so that the table 36 is accordingly decreased in its speed. When it is desired to reduce the speed of movement of the table 36, the valve 148 is operated by its solenoid 149 to a position where the line 147 is connected to line 152 through valve 148. The pressure of the exhaust hydraulic fluid moves valve spool 141 to the position seen in FIG. 9, fluid at the other end of valve spool 141 being exhausted past ball check 154 to port 140.

The constriction in the exhaust passage 140 afforded by the valve spool 141 thus regulates the discharge of the exhaust fluid from cylinder 47.

Mechanism is provided for urging the profiling tool 56 and the motor 58 against the master template 48 seen in FIG. 3, and to this end there is provided a cylinder 161, see FIGS. 3 and 7 which is held as shown to the frame member 101. The cylinder 161 has a piston 162 and a piston rod 162a therein. Piston rod 162a has a stop collar 163 fixed thereto. A yoke 164 held by cap screws 166 to the frame member 94 is urged against the stop collar 163 by a spring 167 having one end abutting the yoke 164 and the other end abutting a stop flange 168 at the end of the piston rod 162a remote from the cylinder 161.

The piston rod end of the cylinder 161 is connected by a pressure line 169, see also FIG. 7, connected to the main pressure line 112. A pressure reducing valve 171, a low pressure reservoir 172 and a manually operated three-way valve 173 are connected in line 169 between cylinder 161 and pressure line 112.

The other end of cylinder 161 is connected to main pressure line 112 by a line 174 and a by-pass valve 176 operated by a solenoid 177 and connected in line 174, see FIG. 7. A flow regulating valve 178 is connected in parallel with by-pass valve 176. Flow regulating valve 178 is operable to maintain a low pressure cushion of air against piston 162, while the pressure in reservoir 172 is sufficient to urge piston 162 to the left against the bias of spring 167, at the same time resiliently urging profile tool 56 against work piece 54 and profile follower 61 against template 48.

Bypass valve 176 is operated by the solenoid 177 and normally blocks the passage of gaseous pressure therethrough. However, valve 176 is de-energized at the end of a work stroke of the work table 36, and at such time, gaseous pressure fluid is effective through valve 176 to push piston 162 to the right as seen in FIGS. 3 and 7, and move profile tool 56 away from the work piece 54.

Structure is provided for regulating the speed of movement of work table 36 in its forward or working stroke, and to this end, see FIG. 3, the work table carries a plurality of switch operating dogs 180, each comprising a threaded screw 181 engaging a square nut 182 guided in a slot 183 carried along the back edge of work table 36. Screws 181 and nuts 182 can be guided in the slot 183 to proper points with reference to the template 48. Each of the screws 181 has a head 184 which is adapted to actuate a slow down switch 186 carried on the frame 31. See also FIG. 11, where slow down switch 186 is shown connected in the control circuit to operate slow down relay 150.

Switching mechanism is provided for de-energizing the control circuit seen in FIG. 11 at the end of the work stroke of table 36, and comprises switch contacts 187 and 188, mechanically connected at 189 and actuated by a dog 191 at the rear end of the work table 36, see FIG. 2.

Similar switching mechanism for de-energizing the control circuit at the end of the return stroke is shown at 192 and 193, linked by member 194 and operated by a cam 196 on work table 36, see also FIG. 2.

Emergency switches 197 and 198 are connected in the control circuit seen in FIG. 11, and are located on the machine 30 as seen in FIG. 1, and are designed to stop the machine in an emergency.

Referring now more specifically to FIG. 11 for details of the control and operating circuits, the numeral 200 designates a starter box having a main control switch 201 therein. Profile motor 58 is supplied preferably with three-phase 120 cycle power at any suitable potential by power leads 202, 203 and 204. Switch 201 also controls conventional 110 v. A.C. single phase power to main control leads 206 and 207.

A cutter start switch 208 is connected in a line 209 and in series with contacts 211 and 212 of emergency stop switches 197 and 198 to complete a circuit through a cutter relay 213 and overload contacts 214 and 216, and including control leads 206 and 207. When cutter relay 213 is energized contacts 213A, 213B and 213C are closed to energize cutter motor 58. A holding contact 213H is also energized by relay 213 and switch 208 can then be released.

A foot control switch 217 need only be momentarily operated, and is connected in a lead 218 across leads 206 and 207, and has a starting relay 219 in series therewith. A contact 219A is closed when relay 219 is energized. The closing of foot switch 217 completes a circuit through solenoid 128 of clamp valve 127 by a lead 221, see also FIG. 7. Limit switch 192 is open at the start of the forward stroke, but closes thereafter, and the circuit to hold solenoid 128 energized includes contact 219A and lead 221 having limit switch now closed. However, the initial operation of solenoid 128 is caused by closing of switch 217 and lead 222 connected from lead 218 to lead 221.

The table 36 moves forward in a work stroke provided pressure switch 121 is closed, see again FIG. 7. The circuit for such forward movement includes a lead 223 connected to lead 206 through overload contacts 214 and 216, the forward relay 118, normally closed contact 120A of reverse relay 120, forward limit switch 193 which is closed at the start of the cycle, a contact 219B closed by starting relay 219, closed contacts 220A and 220B of emergency switches 197 and 198, and closed contact 219A in control lead 207. The energizing of forward relay 118 closes a contact 118A connected in series with the solenoid winding 117 to actuate valve 115 and supply hydraulic pressure fluid to move piston 45 to the left, see FIG. 7.

A holding contact 118B is connected in parallel with limit switch 193, to maintain the before described circuit after limit switch 193 which is arranged to open after the forward stroke of the cycle commences.

The solenoid 119 for valve 116 is de-energized at this time, contacts 224 and 226 of emergency switches 197 and 198 connected in a line 227 in series with winding 119 being open. Hydraulic fluid exhausting from the cylinder 47 is thus free to return to reservoir 110, which is connected to atmosphere through valve 116 and exhaust line 113.

The slow down of table 36 is accomplished by the slow down switch 186 being actuated by the dogs 180, switch 186 being connected in series with the slow down relay 150. Slowing of the work table 36 is had when cutter 56 has to follow profile of template 48 which is at relatively a large angle with respect to the longitudinal axis of the table 36. Slow down relay is a ratchet relay which closes and opens alternately by impulses thereto from the dogs 180 seen in FIG. 2.

When slow down rleay 150 is operated it alternately closes and opens a contact 150A connected in series with solenoid winding 149 of slow down valve 148, which when energized throttles the flow of hydraulic fluid from piston rod end of cylinder 47. According to the disposition of dogs 180, table 36 operates at regular speed or slows down under the control of slow down relay 150.

At the end of a work stroke of table 36 the dog 191 strikes the limit switches 187 and 188, see FIG. 2, switch 187 closing at the end of a work stroke of table 36 and switch 188 opening. At such time the forward relay 118, the slow down relay 150 and the solenoid 117 for valve 115 are de-energized as is also the solenoid 177 for the by-pass valve 176, see also FIG. 7.

However, when the forward relay 118 is energized, it opens a contact 118C connected in series with the reverse relay 120. The forward relay 118 being de-energized, the contact 118C recloses, and a circuit is made including the control lead 207, the lead 228, closed switch 187, closed contact 118C, reverse relay 120, and control lead 206. When reverse relay 120 is energized, it closes a circuit through the solenoid 119 of the reverse valve 116, there being a lead 229 branching from the lead 228, and connected as seen in FIG. 11 to a lead 231 having the reverse valve solenoid 119 connected therein.

When the reverse valve solenoid 119 is energized and the solenoid 117 of forward valve 115 is de-energized, the pressure fluid can by-pass the slow down valve 131, through line 134 and check valve 135, see FIG. 7, to move the piston 45 to the right in a return stroke.

A holding circuit is provided for the reverse solenoid 119, and a line 232 connected to the control lead 207 has a holding contact 120A connected therein, this holding contact maintaing the solenoid 119 in energized condition to pressurize the hydraulic reservoir 110.

The circuit is maintained through the clamp valve solenoid 128 during the return stroke of the table 36, and to this end the limit switch 192 connected in the line 221 which remains closed at the start of the return stroke, has a contact 120B connected in shunt therewith. Contact 120B is closed by the reverse relay 120.

When the table 36 returns to the stop position as determined by the limit switches 192 and 193, actuated by the dog 191, limit switch 192 opens. It will be remembered that foot switch 217 is but momentarily actuated to energize the starting relay 219, it being maintained in energized condition by the lead 222 after the foot switch is released, the contact 219A of the starting relay 219 being closed at this time. At the end of the return stroke, the limit switch 192 opens, thus de-energizing the starting relay 219 and opening the contact 219A thereof.

At the same time the reverse relay 120 will be de-energized, by the opening of the circuit in the starting relay contact 219A. Clamp valve solenoid 128 is also de-energized at this time by the opening of the limit switch 192, contact 120B being opened.

Structure is provided for enabling the table 36 to move to a rest position, after actuating the switches 192 and 193, under control of the cam 196 carried on work table 36. The work table 36 at this time is being advanced to the right as seen in FIG. 7 by pressure fluid acting against piston 45 at the piston rod end of cylinder 47. The valve 116, which is now connected to the source of gaseous pressure fluid by reason of solenoid 119 being energized would normally continue to make full pressure effective against piston 45.

However, the flow of pressure fluid to cylinder 47 is constricted by the valve 124 which is controllably moved to closed position by cylinder 125. Normally cylinder 125 is connected to the high pressure source of gaseous fluid through a flow controlling device 125b which freely admits pressure to cylinder 125 to open the same.

Cylinder 125 has a spring 125a therein urging the piston thereof to the right when pressure is relieved against the same. But flow limiting device 125b is operable to restrict the flow from cylinder 125.

Thus, when valve 127 is de-energized and line 126 is ported to atmosphere therethrough, valve 124 is closed slowly, allowing work table 36 to come to rest smoothly, the table 36 in effect coasting the last two to five inches of movement to final rest position.

The emergency switches 197 and 198 are arranged to be actuated at any time by the operator and the actuation thereof controls the admission of braking fluid to the brake cylinder 108 at the brakes 105 for motor 58, see FIG. 3. The two switches 197 and 198 have respective contacts 233 and 234 which can be selectively connected in a lead 236 having the winding 109 for the brake valve connected therein. When the winding 109 is energized the brake shoe 105 is brought into contact with the flanged end 104 of the cutter shaft 57.

From the foregoing description, it is believed evident that there has been provided a novel mechanism for controlling the operation of the work table and the cutter in a profiling and contour machine. It will be seen from the description that the feed of the work table is controlled according to rate that the profiling cutter 56 is to be moved into the workpiece, laterally of the direction of the movement of the table 36, so that the proper profiling of the work piece can be readily accomplished regardless of relatively sharp direction changes in the template or pattern. It will be seen also that the profiling cuter is retracted during the return movement of the table, and that it need not retrace the template profile during such return movement.

While the invention has been described in terms of a preferred embodiment, its scope is intended to be limited only by the claims here appended.

We claim:

1. In a machine for forming a work piece with a contour corresponding to a master template, a main frame and a work table movable with respect thereto, means for holding a work piece and a master template on said work table, a profiling tool adapted to follow the contour of said template and engaged with said work piece, a fluid pressure circuit for moving said table comprising hydraulic fluid and gaseous fluid for pressurizing said hydraulic fluid, a piston and cylinder for moving said work table, a hydraulic fluid reservoir connected at each end of said cylinder and adapted selectively to be pressurized by the gaseous fluid for hydraulically driving said pistons according to the direction of movement of said work table, and a slow down valve connected between one of said reservoirs and a corresponding end of said cylinder and adapted to pass fluid readily therethrough when said cylinder and piston are moving said table at regular speed and to restrict the passage of said fluid when said table is moving at slow speed, said valve comprising a valve body, a normally open port in said valve body connected to said one reservoir and said cylinder, a valve spool slidable in said valve body and movable in response to endwise pressure from a normally open position to a position constricting said port, a control valve connected between said slow down valve and said cylinder for operating said valve spool, and means operated by movement of said work table for actuating said control valve.

2. In a machine for forming a work piece with a contour corresponding to a master template, a main frame and a work table movable with respect thereto, means for holding a work piece and a master template on said work table, a profiling tool adapted to follow the contour of said template and engaged with said work piece, a fluid pressure circuit for moving said table comprising a hydraulic driving fluid and a gaseous fluid for pressurizing said hydraulic fluid, a piston and cylinder for moving said work table, a hydraulic fluid reservoir connected at each of said cylinder, valve means controlling the gaseous fluid for selectively pressurizing said reservoirs according to the direction of movement of said work table, and a slow down valve connected between one of said reservoirs and a corresponding end of said cylinder and adapted to pass fluid readily therethrough when said cylinder and piston are moving said table at regular speed and to restrict the passage of fluid when said table is moving at slow speed, said valve comprising a valve body, a normally open port in said valve body connected to said one reservoir and said cylinder, a valve spool slidable in said valve body and movable from a normally open position to a position constricting said port, a control valve connected between said slow down valve and said cylinder for operating said valve spool, and means operated by movement of said work table for actuating said control valve.

3. In a machine for forming a work piece with a contour corresponding to a master template, a main frame and a work table movable with respect thereto, means for holding a work piece and a master template on said work table, a profiling tool adapted to follow the contour of said template and engaged with said work piece, a fluid pressure circuit for moving said table comprising a hydraulic fluid and gaseous fluid for pressurizing said hydraulic fluid, a piston and cylinder for moving said work table, an hydraulic fluid reservoir connected at each end of said cylinder and adapted selectively to be pressurized by the gaseous fluid for driving said piston according to the direction of movement of said work table, and a slow down valve connected between one of said reservoirs and a corresponding end of said cylinder and adapted to pass fluid readily therethrough when said cylinder and piston are moving said table at regular speed and to restrict the passage of said fluid when moving said table at slow speed, said valve comprising a valve body, a port in said valve body connected to said one reservoir and said cylinder, a valve spool slidable in said valve body and movable from a normally open position to a position constricting said port, means for limiting the movement of said valve spool to adjust the constriction of said port, a control valve connected between said slow down valve and said cylinder for operating said valve spool from one position to the other, and means for actuating said control valve at predetermined intervals during the movement of said work table.

4. In a machine for forming a work piece with a contour corresponding to a master template, a main frame and a work table movable with respect thereto, means for holding a work piece and a master template on said work table, a profiling tool adapted to follow the contour of said template and engaged with said work piece, a fluid pressure circuit for moving said table comprising a hydraulic driving fluid and a gaseous fluid for pressurizing said hydraulic fluid, a piston and cylinder for moving said work table, a hydraulic fluid reservoir connected at each end of said cylinders and adapted selectively to be pressurized by the gaseous fluids for driving said piston according to the direction of movement of said work table, and a slow down valve connected between one of said reservoirs and a corresponding end of said cylinder and adapted to pass fluid readily therethrough when said cylinder and piston are moving said table at regular speed and to restrict the passage of said fluid when moving said table at slow speed, said valve comprising a valve body, a port in said valve body connected to said one reservoir and said cylinder, a valve spool slidable in said valve body and movable between a normally open piston and a position to constrict said port, a control valve connected between said slow down valve and said cylinder for operating said valve spool from one position to the other, means for actuating said control valve during movement of said work table, and means for bypassing said slow down valve during return movement of said table.

5. In a machine for forming a work piece with a contour corresponding to a master template, a main frame and a work table movable with respect thereto, means for holding a work piece and a master template on said work table, a profiling tool adapted to follow the contour of said template and engage with said work piece, a piston and cylinder for moving said work table, a hydraulic fluid reservoir connected at each end of said cylinder and adapted to be pressurized for driving said piston according to the direction of movement of said work table, means for pressurizing said reservoirs selectively, and a slow down valve connected between one of said reservoirs and a corresponding end of said cylinder and adapted to pass fluid readily therethrough when said cylinder and piston are moving said table at regular speed and to restrict the passage of said fluid when moving said table at slow speed, said slow down valve comprising a valve body, a port in said valve body connected to said one reservoir and said cylinder, a valve spool slidable in said valve body and movable between a normally open position and a position constricting said port, a control valve connected between said slow down valve and said cylinder for operating said valve spool from one position to the other, and means for actuating said control valve during movement of said work table.

6. In a machine for forming a work piece with a contour corresponding to a master template, a main frame and a work table movable with respect thereto, means for holding a work piece and a master template on said work table, a profiling tool adapted to follow the contour of said template and engage with said work piece, a piston and cylinder means for moving said work table, a hydraulic fluid reservoir connected at each end of said cylinder means and adapted selectively to be pressurized according to the direction of movement of said work table, means for pressurizing said reservoirs, and a slow down valve connected between one of said reservoirs and a corresponding end of said cylinder and adapted to pass fluid readily therethrough when said cylinder and piston means is moving said table at regular speed and to restrict the passage of fluid when moving said table at slow speed, said slow down valve comprising a valve body, a port in said valve body connected to said one reservoir and said cylinder, a valve spool slidable in said valve body and movable between a normally open position and a position constricting said port, a control valve connected between said slow down valve and said cylinder for operating said spool from one position to the other, and means for actuating said control valve at predetermined intervals.

7. In a machine for forming a workpiece with a contour corresponding to a master template, a main frame and a work table movable with respect thereto, means for holding a workpiece and a master template on said work table, a profiling tool adapted to follow the contour of said template and engage with said workpiece, a fluid pressure system for moving said table and said tool comprising a reversible hydraulic fluid circuit and a gaseous fluid means for pressurizing said hydraulic fluid circuit selectively, hydraulic motor means for moving said work table, valve means for controlling the application of hydraulic pressure fluid to said hydraulic motor means to regulate the speed of said work table, means mounted on said main frame and said work table and positioned in relationship to the contours of said template for operating said valve means, said valve means comprising a valve body having a fluid flow passage therethrough and a valve member shiftable therein by operation of said last named means for restricting said flow passage.

8. In a machine for forming a workpiece with a contour corresponding to a master template, a main frame and a work table movable with respect thereto, means for holding a workpiece and a master template on said work table, a profiling tool adapted to follow the contour of said template and engage with said workpiece, a fluid pressure system for moving said table comprising a hydraulic fluid circuit and a gaseous fluid means for pressurizing said hydraulic fluid circuit, hydraulic motor means connected with said hydraulic circuit for moving said work table, valve means controlling the application of hydraulic pressure fluid to said hydraulic motor means according to the direction of movement of said work table, speed control valve means for regulating the volume rate of hydraulic fluid actuation of said hydraulic motor means, control means mounted on said main frame for actuation during movement of said work table by means positioned in relationship to the changing contours of said template for controlling said speed control valve means, said speed control valve means comprising a valve body having a normally open fluid passage therethrough and a valve member shiftable therein to restrict said fluid passage, and means for shifting said valve member in response to actuation of said control means.

9. The invention as defined in claim 8 wherein the means mounted on the frame and work table comprise a switch on said frame and switch actuators on said table for controlling the operation of the said speed control valve means.

10. In a machine for forming a workpiece with a contour corresponding to a master template, a main frame and a work table reciprocatively movable with respect thereto through a foward work stroke and a return stroke, means for holding a workpiece and a master template on said work table, a profiling tool adapted to follow the contour of said template and engage with said workpiece, a fluid pressure system for moving said table comprising hydraulic fluid means and gaseous fluid means for pressurizing said hydraulic fluid means, reversible hydraulic motor means connected with said hydraulic fluid means for moving said work table, means for controlling the application of hydraulic pressure fluid to said hydraulic motor means according to the direction of movement of said work table, and means for progressively restricting the flow of pressurized hydraulic fluid to said motor means at a predetermined point adjacent the end of the return stroke of said work table.

11. In a machine for forming a workpiece with a contour corresponding to a master template, a main frame and a work table reciprocatively movable with respect thereto, means for holding a workpiece and a master template on said work table, a profiling tool adapted to follow the contour of said template and engage with said workpiece, a fluid pressure circuit for moving said table comprising hydraulic fluid means and gaseous fluid means for pressurizing said hydraulic fluid means, hydraulic motor means connected with said hydraulic fluid means for moving said work table, and means controlling the application of gaseous pressure on said hydraulic fluid means for operating said hydraulic motor means according to the desired direction of movement of said work table.

References Cited in the file of this patent
UNITED STATES PATENTS

| | | |
|---|---|---|
| 2,272,684 | Vickers | Feb. 10, 1942 |
| 2,716,925 | Roechm | Sept. 6, 1955 |
| 2,897,651 | Bregenzer | Aug. 4, 1959 |
| 2,965,132 | Couffer et al. | Dec. 20, 1960 |
| 2,965,133 | Rice et al. | Dec. 20, 1960 |